United States Patent [19]
Oullette et al.

[11] Patent Number: 5,509,625
[45] Date of Patent: Apr. 23, 1996

[54] ELECTRICAL BRUSH-WEAR INDICATOR

[75] Inventors: David A. Oullette, Farmington; George D. Rogers, Jr., Enfield, both of Conn.

[73] Assignee: United Technologies Corp., Windsor Locks, Conn.

[21] Appl. No.: 171,010

[22] Filed: Dec. 21, 1993

[51] Int. Cl.⁶ ................................................ B64D 15/12
[52] U.S. Cl. ........................................ 244/134 D; 310/245
[58] Field of Search ........................... 244/134 R, 134 D; 416/95; 310/245; 340/648

[56]        References Cited
          U.S. PATENT DOCUMENTS

| | | | |
|---|---|---|---|
| 3,908,142 | 9/1975 | Gaudry | 310/245 |
| 4,316,186 | 2/1982 | Purdy et al. | 340/648 |
| 4,542,374 | 9/1985 | Kollmannsberger | 310/245 |
| 4,636,778 | 1/1987 | Corkran et al. | 310/245 |
| 4,652,783 | 3/1987 | Cheesmore | 310/245 |
| 4,837,920 | 6/1989 | Sweet et al. | |
| 5,020,741 | 6/1991 | Ziegler et al. | |
| 5,131,812 | 7/1992 | Boyd et al. | |

Primary Examiner—Galen L. Barefoot
Attorney, Agent, or Firm—Donald S. Holland; Holland & Bonzagni

[57]        ABSTRACT

A monitoring system is disclosed to automatically indicate excessive wear of electrical brushes in deicer assemblies for aircraft. In the preferred embodiment, the indicator system includes an electrical brush with an initially insulated wire embedded in it; and an electrical detection circuit, connected to the brush, with a warning device such as a light. When the brush becomes worn, through excessive "end wear" and/or "flank wear", the insulated wire becomes exposed and eventually stripped at the point of wear. This creates a conductive path from the electrical brush, through the bare wire spot, to the detection circuit. This turns on the warning device to indicate that the brush has become worn and needs replacement.

2 Claims, 2 Drawing Sheets

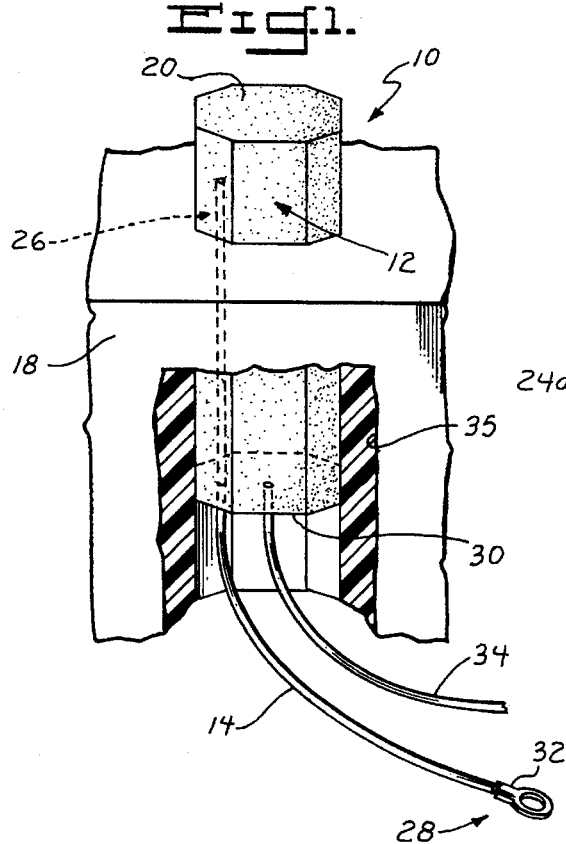
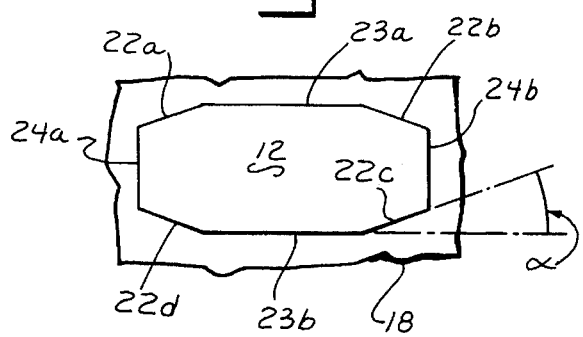
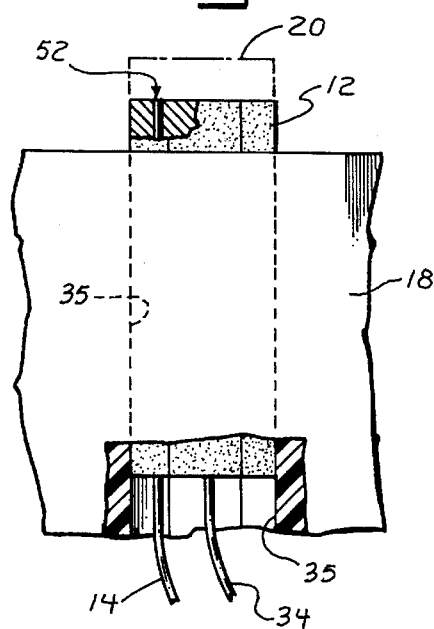
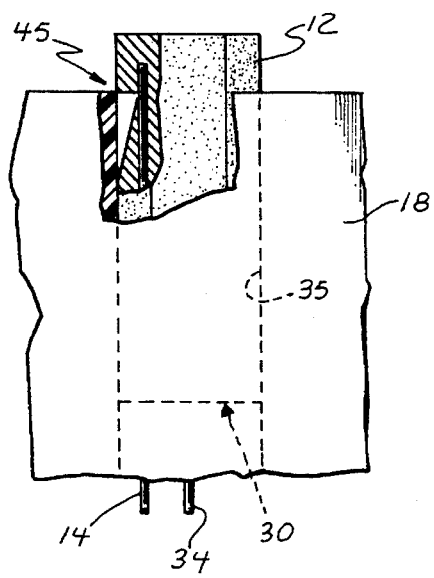

ELECTRICAL BRUSH-WEAR INDICATOR

BACKGROUND OF THE INVENTION

This invention relates in general to slip ring assemblies for electrothermal deicer systems in aircraft. More particularly, it relates to a monitor that indicates when an electrical brush, used in such systems, has worn.

It is common for aircraft propeller blades to carry electrical heating elements or boots for preventing the build-up of ice on the blades. See, for example, U.S. Pat. No. 5,020,741 to Ziegler et al. Electrical power is transmitted to these boots, mounted on the rotating blades, from the stationary portion of the propeller assembly. Concentric slip rings, attached to the spinner bulkhead or propeller hub, contact non-rotating electrical brushes, mounted on the stationary support (or journal) for the rotor. Each ring typically transmits the power to a pair of blade boots.

Due to the constant rotational rubbing of the rings (typically copper) against the brushes (typically carbon graphite), the brushes tend to wear. This occurs most at their ends ("end wear") but also can occur along their flanks ("flank wear").

Because of the tight fit between the rotating and stationary portions of the propeller assembly, the brushes are basically unseen. It is virtually impossible to detect, strictly through visual checking, when the brushes start to wear and are about to become inoperative.

Accordingly, it is the primary object of the present invention to provide a warning system that indicates electrical brush wear.

It is another object to provide a detection system that automatically indicates when the amount of wear is excessive and necessitates brush replacement.

It is another object to provide a detection system that automatically indicates excessive end wear and/or flank wear.

It is another object to provide a brush-wear indicator that is extremely simple, yet highly reliable.

The above and other objects will become more readily apparent when the following description is read in conjunction with the accompanying drawings.

BRIEF DESCRIPTION OF THE DRAWINGS

FIG. 1 is a fragmentary perspective view of a plastic housing with a novel electrical brush constructed in accordance with the present invention;

FIG. 2 is an enlarged top plan view of the brush and housing in FIG. 1;

FIG. 3 is a side plan view showing the brush after end wear has occurred;

FIG. 4 is a perspective view showing flank wear of the brush;

SUMMARY OF THE INVENTION

Figure 5:
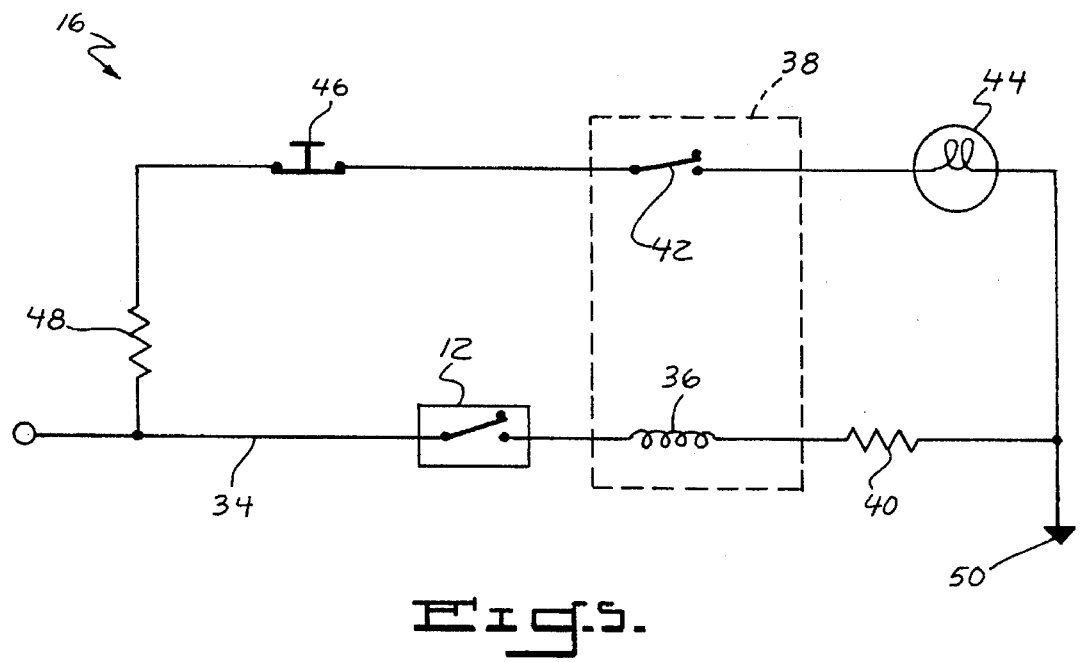
FIG. 5 shows a detection circuit constructed in accordance with the present invention, that is in the normally opened or "off" position.

An automatic brush-wear indicator is disclosed. In the preferred embodiment, the indicator assembly includes an electrical brush in a holder; an initially insulated wire embedded in the brush; and a detector circuit in the holder. As the brush wears ("end wear" and/or "flank wear"), the wire eventually becomes exposed, and the insulation becomes stripped at the point of wear. Current is then transmitted from the brush to the wire, and it trips a relay switch in the circuit. This switches a small amount of current from the brush to illuminate a light, warning of a predetermined number of hours remaining before brush replacement. The circuit remains active until the brushes are replaced, or a manual disable switch is used.

DETAILED DESCRIPTION OF THE PREFERRED EMBODIMENT

Referring to the drawings, an electrical brush-wear indicator system is disclosed and generally referenced by the numeral 10. In the preferred embodiment, the system 10 includes a modified electrical brush 12 of the type used in a slip ring assembly for deicer systems (not shown); a normally insulated wire 14 embedded in the brush 12; and a detection circuit 16 carried in a holder 18 for the brush.

Brush 12 is preferably made of carbon graphite. This enables its tip 20 to conduct electricity to a nearby commutator or slip ring, such as that shown in U.S. Pat. No. 5,020,741 to Ziegler et al. (which is hereby incorporated by reference). As shown in this application's FIG. 1, brush 12 is a constant shaped column. Any horizontal cross section, along the column's entire length, is an unequal octagon. The preferred unequal octagon has four identical chamfers 22a, 22b, 22c, 22d at its corners (see FIG. 2). For comparative purposes only (since the brush's shape and dimensions form no part of the invention), their edge lengths in a prototype are approximately 4.0 mm. The chamfer angle α is approximately 15°.

There are two identical legs or sides 23a, 23b on the top and bottom of the unequal octagon. Top leg 23a is between chamfers 22a, 22b and bottom leg 23b is between chamfers 22c, 22d. They are parallel, and each is approximately 10.1 mm.

The remaining sides of the unequal octagon are shown as left and right vertical edges 24a, 24b in FIG. 2. They are also parallel to one another, and each is approximately 5.6 mm.

One end portion 26 of wire 14 is normally embedded deeply in brush 12 (see FIG. 1). It is preferably a soft copper conductor, sheathed in any standard insulative coating to prevent electricity from passing through the wire to the detection circuit 16. This wire portion runs parallel to the longitudinal axis of the brush, but is slightly offset to detect adjacent flank wear (see FIG. 4). It is also set back initially from brush tip 20 to allow for a selected amount of end wear of the brush (see FIG. 3) prior to any warning occurring.

While one end 26 of wire 14 is embedded inside brush 12, the other wire end 28 freely extends beyond the brush bottom 30, as viewed in FIG. 1. It has a standard terminal connector 32 for attaching the brush to the detector circuit 16, carried in the holder 18. Another wire 34 is also connected to the bottom 30 to transmit standard aircraft power (113 V.A.C.) to the brush through components in the brush holder 18.

Brush holder 18 is made of any suitable, durable plastic or other non-conductive material. It is similar to those already used in the prior art by Hamilton Standard, a division of United Technologies Corporation, of Windsor Locks, Conn.; the B.F. Goodrich Company of Akron, Ohio; and D.J. Mouldings International Ltd. of Wallingford, England. Those prior holders typically house a plurality of brushes in discrete channels or throughbores. The only major differences in holder 18 are that: its channels (e.g., 35) correspond to the unequal octagonal shape of brush 12; and it also carries the novel detection circuit 16.

Figure 6:
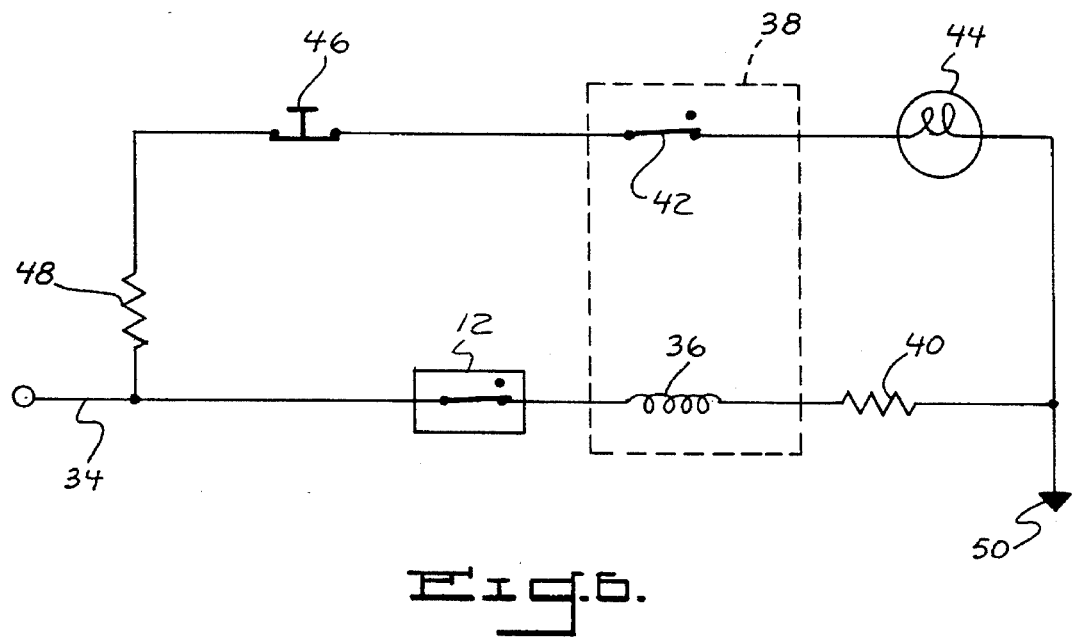
FIG. 6 shows the circuit closed, indicating excessive end wear or flank wear of the brush.

Detection circuit 16 is shown in FIGS. 5–6. Its main line includes wire 34, which supplies power to brush 12; brush 12, which acts as a normally opened switch (see FIG. 5) to selectively transmit current to a solenoid 36 in a shunt relay 38; and a grounded resistor 40 that limits the current through the solenoid 36. A parallel line includes a normally opened switch portion 42 of relay 38; a warning light 44 operated by the relay switch 42; a manual disable switch 46 to cut off the light 44; and a resistor 48 to limit the current through the light 44.

In operation, the brush 12 (together with wire 14) acts as a switch. When the embedded wire portion 26 is totally sheathed (as in FIG. 1), this "brush" switch is normally opened (see FIG. 5); and the solenoid 36 is off. If either flank wear or end wear occurs to the point shown in FIGS. 3–4, the "brush" switch closes and transmits current to the solenoid 36. The energized solenoid then trips the relay switch 42 (see FIG. 6). At that point, the parallel line closes and passes power through the closed relay 38 to activate the light 44, or a buzzer (not shown).

Flank wear occurs by axial movement of the brush, and side pressure, due to the rotation of the commutator ring. The brush is progressively worn away (at 45), exposing at first the embedded insulated wire 14 at the point of wear (see FIG. 4). The carbon graphite dust from the brush wearing becomes trapped (at 45) in the brush holder's throughbore 35 in which the brush is housed. Continued pressure and movement strips the insulative coating from the side of wire 14, exposing a bare portion of the soft copper wire. The brush dust creates a conductive path from the brush 12, carrying supply voltage back through the bare spot of wire 14 to ground 50.

In end wear, the brush tip 20 is worn away by contact with the commutator ring, exposing at first the insulated tip 52 of embedded wire 14 (see FIG. 3). Continued rubbing by the ring strips the insulative coating there from the copper wire. This creates a conductive path from the carbon graphite brush 12, through the slip ring, and through the bare wire tip 52, to detector circuit 16.

Once tripped, the warning light 44 stays on until the worn brush(es) are replaced. Alternately, an operator can disable the circuit, and shut off the light, by using manual switch 46. In instances where user bypass is to be prevented, the manual disable switch 46 can simply be deleted from the circuit 16.

It should be understood by those skilled in the art that obvious structural modifications can be made without departing from the spirit or scope of the invention. For example, the brush's cross section could be any shape provided an anti-rotation feature was provided to prevent wire twisting and insure alignment of the brush to the ring. Accordingly, reference should be made primarily to the accompanying claims, rather than the foregoing specification, to determine the scope of the invention.

Having thus described the invention, what is claimed is:

1. In a deicer system for aircraft propeller blades of the type having a rotating slip ring that contacts a non-rotating elongated electrical brush housed in a brush holder, the improvement comprising:

a. the brush having a central longitudinal axis and two ends, wherein one of the brush ends is a tip end that extends, at least initially, beyond the brush holder to contact the rotating slip ring and the other brush end is an opposite end that does not contact the slip ring, wherein the opposite end is connected to a power source;

b. a wire having at least one insulated end portion initially embedded in the brush, wherein the end portion is parallel to the longitudinal axis and has a wire tip that is set back initially from the tip end of the brush;

c. an electrical warning device connected to the wire, wherein the warning device is activated by current transmitted from the brush through the wire, when the wire tip becomes exposed and stripped due to excessive end wear of the brush; and d. wherein the embedded end portion that is substantially parallel to the longitudinal axis is also offset therefrom, whereby part of the end portion becomes exposed and bare, upon excessive flank wear of the brush, to activate the warning device by dust from the worn brush, trapped in the holder adjacent the bare part of the wire, carrying electrical current from the brush to the bare part of the wire.

2. A brush-wear indicator system for deicer assemblies in aircraft, said system comprising:

a. an elongated electrical brush connected to a power source, said brush having a central longitudinal axis and two ends;

b. a wire having at least one insulated end portion initially embedded in the brush, said end portion being parallel to the axis and having a wire tip that is set back initially from an adjacent end of the brush;

c. an electrical detection circuit, connected to the wire, wherein the circuit includes a shunt relay with a solenoid that trips a relay switch to activate a warning device When the wire tip becomes exposed due to excessive end wear of the brush, indicating that the brush needs to be replaced; and d. wherein the embedded end portion that is parallel to the longitudinal axis is also offset therefrom, whereby part of said end portion becomes exposed and bare, upon excessive flank wear of the brush, to activate the warning device by dust from the worn brush, trapped in the holder adjacent the bare part of the wire, carrying electrical current from the brush to the bare part of the wire.

\* \* \* \* \*